United States Patent [19]
Mattis et al.

[11] Patent Number: 5,998,763
[45] Date of Patent: Dec. 7, 1999

[54] ELECTRICAL ACCESSORY FOR VEHICLES AND THE LIKE

[75] Inventors: Donald J. Mattis, Norwalk; Ali El-Haj, Trumbull, both of Conn.

[73] Assignee: Casco Products Corporation, Bridgeport, Conn.

[21] Appl. No.: 09/189,285

[22] Filed: Nov. 10, 1998

[51] Int. Cl.$^6$ ....................................... F23Q 7/00
[52] U.S. Cl. ................................. 219/265; 219/263
[58] Field of Search ............................... 219/263, 264, 219/265, 267, 269; 362/84, 61, 32

[56] References Cited

U.S. PATENT DOCUMENTS

| | | | |
|---|---|---|---|
| Re. 26,316 | 12/1967 | Horwitt | 219/265 |
| 2,210,025 | 8/1940 | Cohen | 219/32 |
| 2,224,034 | 12/1940 | Lehmann | 219/32 |
| 2,248,402 | 7/1941 | Conboy | 219/32 |
| 2,256,876 | 9/1941 | Wolfson | 219/32 |
| 2,262,484 | 11/1941 | Bahr | 219/32 |
| 2,883,510 | 4/1959 | Krautwurst et al. | 219/32 |
| 3,012,120 | 12/1961 | Gaudet | 200/116 |
| 3,238,353 | 3/1966 | Lybrook | 219/265 |
| 3,424,414 | 1/1969 | Horwitt | 248/27 |
| 3,462,721 | 8/1969 | Boudreau | 337/75 |
| 3,532,849 | 10/1970 | Horwitt | 219/265 |
| 3,818,179 | 6/1974 | Mase | 219/267 |
| 3,863,047 | 1/1975 | Mase | 219/265 |
| 3,870,857 | 3/1975 | Horwitt et al. | 219/267 |
| 3,892,944 | 7/1975 | Horwitt et al. | 219/270 |
| 3,904,848 | 9/1975 | Horwitt et al. | 219/267 |
| 4,011,000 | 3/1977 | Wharton | 339/130 |
| 4,058,701 | 11/1977 | Gruber | 219/270 |
| 4,130,815 | 12/1978 | Horwitt et al. | 338/282 |
| 4,207,455 | 6/1980 | Horwitt et al. | 219/265 |
| 4,498,726 | 2/1985 | Mattis | 339/182 R |
| 4,544,226 | 10/1985 | Lupoli | 339/130 R |
| 4,650,962 | 3/1987 | Pramaggiore | 219/264 |
| 4,713,733 | 12/1987 | Fitz et al. | 362/80 |
| 5,030,811 | 7/1991 | von Gaisberg et al. | 219/268 |
| 5,116,233 | 5/1992 | Croce | 439/161 |
| 5,233,162 | 8/1993 | von Gaisberg et al. | 219/265 |
| 5,403,996 | 4/1995 | Mattis | 219/265 |
| 5,493,098 | 2/1996 | Diederich | 219/265 |

FOREIGN PATENT DOCUMENTS

| | | |
|---|---|---|
| 495720 | 7/1992 | European Pat. Off. |
| 929562 | 6/1955 | Germany |
| 2099122 | 1/1982 | United Kingdom |

*Primary Examiner*—John A. Jeffery
*Assistant Examiner*—Vinod D Patel
*Attorney, Agent, or Firm*—Mitchell D. Bittman; K. Gibner Lehmann

[57] ABSTRACT

An electrical power-operated accessory for automobiles and other vehicles, comprises an automatic electrical cigar lighter or power outlet device consisting of a holder structure which includes a socket having electrical contacts, and either an ignitor plug receivable in the socket for use with tobacco products, or else a power outlet plug to provide a source of power for operating other equipment. The ignitor plug has an electrical heating coil, and the socket has a base-mounted automatic switch to control the operating current. The socket also has safety overload protection in the form of a PTC wafer which functions to prevent overcurrent conditions. A glow ring on the holder or socket is illuminated concurrently with energization of the heating coil or the power outlet, or else separately controlled from an outside source.

19 Claims, 6 Drawing Sheets

ELECTRICAL ACCESSORY FOR VEHICLES AND THE LIKE

NO CROSS REFERENCES TO RELATED APPLICATIONS

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

1. Field of the Invention

This invention relates generally to electrical accessory items as used in connection with vehicles, and more particularly to electrical cigar lighters and power outlets.

2. Description of the Related Art Including Information Disclosed Under 37 CFR §§1.97–1.99

The following references are hereby cited as being representative of some of the known prior art in the field to which the present invention pertains:

U.S. Pat. Nos.: 4,207,455 5,493,098

U.S. Pat. No. 4,207,455 discloses an automatic electric cigar lighter wherein automatic switching is carried by a panel-mounted socket or holder for an ignitor plug which latter is removed by the user for the purpose of lighting a cigar or cigarette. A safety feature is built into the automatic switching in that overheat conditions will activate a bimetallic element of the switch to open-circuit the same prior to a dangerous heat condition developing, which could result in fire. No visual signal such as a glow ring carried by the holder or socket is provided, in addition to the safety measure of the bimetallic element incorporated in the switch. Nor is there any illumination that would tend to aid the user in locating the socket when the igniting unit is to be returned thereto.

U.S. Pat. No. 5,493,098 discloses an automatic electric cigar lighter which has an incandescent bulb that becomes lighted to illuminate a glow ring which encircles the socket of the holder device, not only for aesthetic reasons but also to aid in locating the socket when the igniting unit is to be restored to its storage position. This bulb is typically illuminated simultaneously with illumination of the instrument panel of the vehicle, such as when the latter is in use.

The automatic switching of this lighter is also carried by the holder or socket, and comprises bimetallic clips which grip the ignitor cup that carries the heating element. A safety feature is incorporated, comprising a bimetallic shunt which operates to short circuit the heating element in the event that overheating occurs, thereby to blow the fuse in the line circuit which provides energy to the lighter. While this overheat device operated satisfactorily it represented an additional cost and inconvenience, and required careful adjustment and installation to insure proper operation.

Also, there were situations where the illumination that was incorporated was desired to function in a different manner or at other times than simultaneously with illumination of the dash board or instrument panel of the vehicle.

With the development and advent of numerous outboard accessories which were devised for use with vehicles, there was a need for a heavy-duty and serviceable power outlet that was conveniently available, and in consequence of this the existing receptacle for the igniting unit was placed into use to serve this double purpose. In some circumstances this proved to be satisfactory, although added safety was felt to be desirable, and the reliability of the circuit continuity remained a question.

The above-noted disadvantages of prior automatic electric accessories such as cigar lighters and power outlets are obviated by the present invention, and one object of the invention is to provide an improved, simplified electrical accessory in the form of an automatic electric cigar lighter and/or power outlet for vehicles and the like, which has reliable and simplified safety means that minimizes to the greatest extent the possibility of current overload and any attendant damage resulting therefrom.

Another object of the invention is to provide an improved, simplified electrical accessory in the form of an automatic electric cigar lighter and/or power outlet accessory as characterized above, which has illumination means for the socket or holder device and wherein the illumination is operative simultaneously only with energization of the igniting unit of the lighter.

A feature of the invention is the provision of an improved appliance as above set forth, wherein the safety means is especially simple and reliable, resulting in lower costs regarding components and labor.

A still further object of the invention is to provide an improved electrical appliance as above characterized, which while primarily intended for use as an electric cigar lighter can function equally as well as a power outlet for use with other equipment such as outboard appliances and the like.

Yet another object of the invention is to provide an improved electrical appliance in accordance with the above, which enables the lighting means to be controlled from a source exterior to the appliance, thereby to suit different conditions of use not necessarily associated with operation of the appliance.

A further object of the invention is to provide an improved automatic electrical appliance of the kind indicated, which is adapted to accept standard connector plugs of the type intended to provide supply voltages for outboard accessories, from the voltages which are available in vehicles and the like.

A feature of the invention is the provision of an automatic electrical appliance as above set forth, which is especially simple and straight-forward in its construction, thereby to enable economies to be effected in the fabrication of its parts, and in its assembly.

In accomplishing the above objects the invention provides a novel combination structure comprising a holder device having a socket which includes basically two electrical contacts forming part of the cigar lighter electrical circuit. An ignitor plug is receivable in the socket, such plug having a manually-operable part that is shiftable between closed energizing and open de-energizing positions, and having an electrical resistance heating element carried at its inner end. The holder device has normally-open semi-automatic switch means for establishing an electrical circuit from the electrical contacts of the holder device through the heating element in response to shifting force applied to the manually-operable part for the purpose of shifting the same to its closed energizing position. There are means for automatically returning the manually-operable part to its open de-energizing position upon removal of the shifting force therefrom. An illuminable member such as a glow ring is carried by the socket, and an electric light-emitting means is provided for furnishing illumination to said member, as well as means for energizing the light-emitting device in response to closing of the switch means. The switch means includes an automatic device for actuating it in response to the attainment of a predetermined heating of the heating element. The device for energizing the light-emitting means comprises a light-current line having a pair of light-current contacts which engage each other in abutting relation. A unique wafer-like positive temperature coefficient resistor which functions as a safety element is included in the main current carrying circuit to prevent overheating and damage therefrom. A power-outlet plug can be substituted for the cigar lighter igniting unit plug, where the accessory is to be used for outboard equipment.

Other features and advantages will hereinafter appear.

BRIEF DESCRIPTION OF THE DRAWINGS

In the accompanying drawings, illustrating several embodiments of the invention.

DESCRIPTION OF THE PREFERRED EMBODIMENTS

The present invention concerns improvements in the AUTOMATIC ELECTRIC CIGAR LIGHTER WITH BASE SWITCH described and claimed in U.S. Pat. No. 4,207,455 issued on Jun. 10, 1980 to Laurence G. Horwitt and Donald J. Mattis, and improvements in the ELECTRIC CIGAR LIGHTER HAVING COMBINED ASSEMBLER AND CONNECTOR PLUG AT ITS REAR described and claimed in U.S. Pat. No. 5,493,098 issued Feb. 20, 1996 to Peter Diederich, both of which have common ownership with the present application, and the disclosures of these patents are hereby incorporated herein by reference as forming part of the disclosure of the present application.

Figure 1:
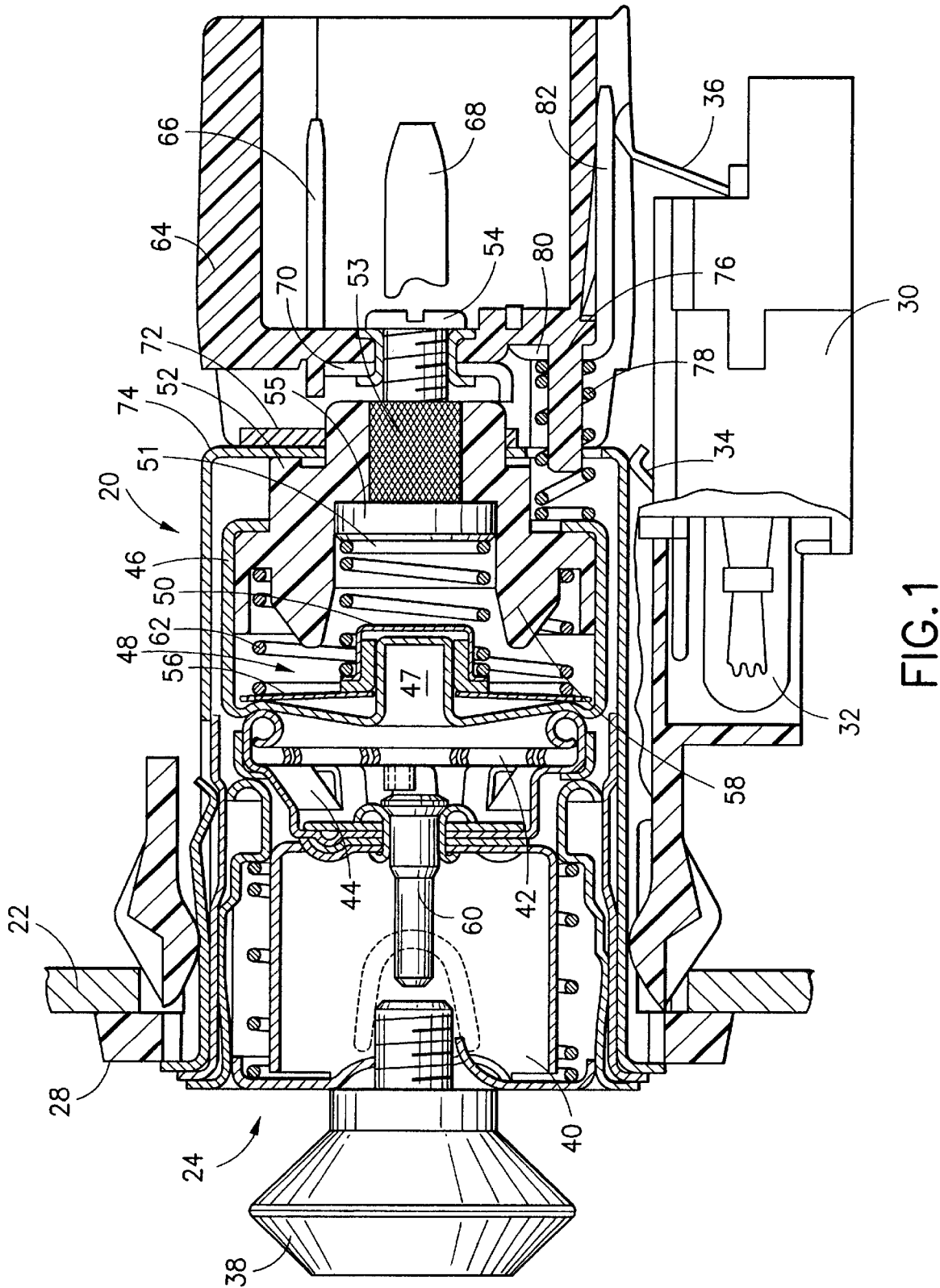
FIG. 1 is an axial sectional view of an automatic electric cigar lighter with glow ring illumination, illustrating one embodiment of the invention.
Figure 2:
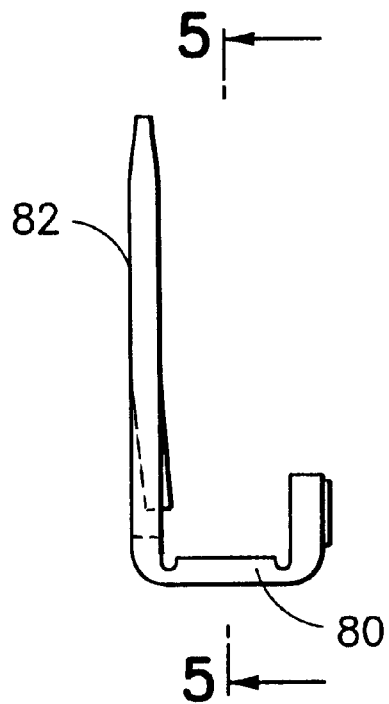
FIG. 2 is a side elevational view of an auxiliary contact prong carried by the connector plug assemblage of the cigar lighter of FIG. 1.
Figure 3:
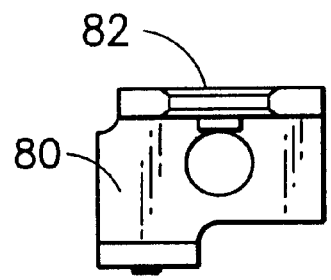
FIG. 3 is a top plan view of the contact prong of FIG. 2.
Figure 4:
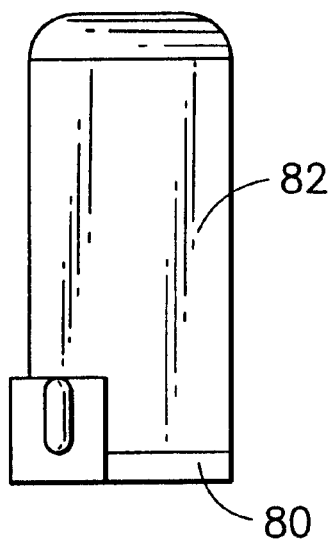
FIG. 4 is a right side elevational view of the contact prong of FIG. 2.
Figure 5:
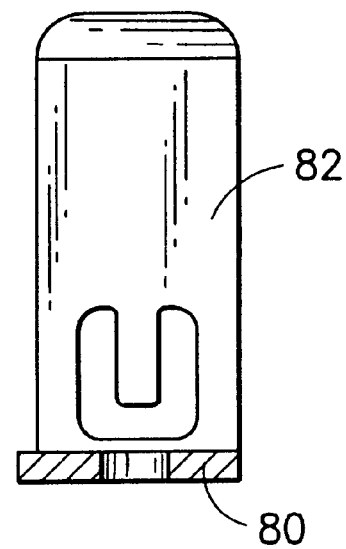
FIG. 5 is a vertical sectional view of the contact prong, taken on the line 5—5 of FIG. 2.
Figure 6:
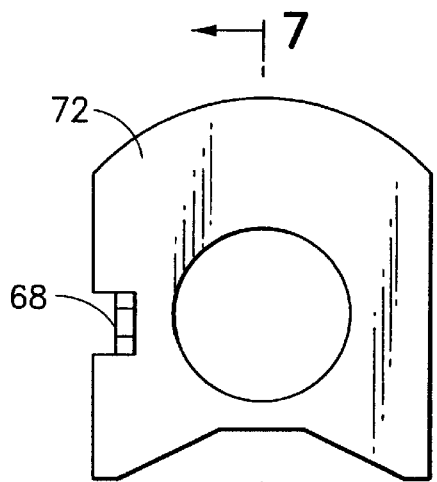
FIG. 6 is a top plan view of the grounding prong of the connector plug assemblage of the cigar lighter of FIG. 1.
Figure 7:
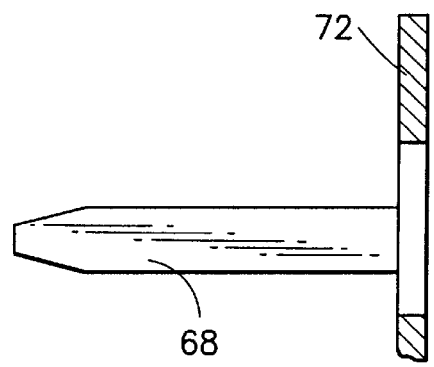
FIG. 7 is a sectional view of the grounding prong taken on the line 7—7 of FIG. 6.
Figure 8:
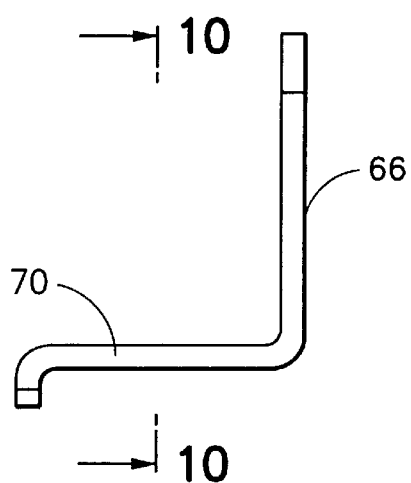
FIG. 8 is a side elevational view of the positive contact prong carried by the connector plug assemblage of the cigar lighter of FIG. 1.
Figure 9:
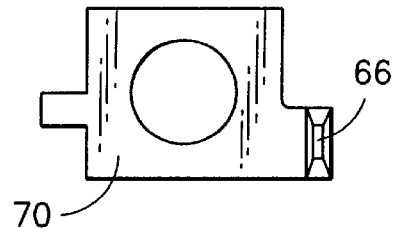
FIG. 9 is a top plan view of the positive contact prong of FIG. 8.
Figure 10:
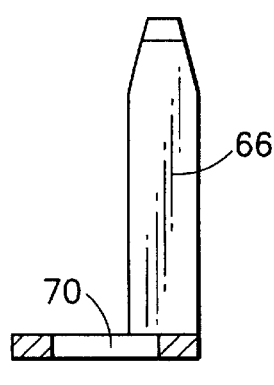
FIG. 10 is a vertical sectional view of the prong, taken on the line 10—10 of FIG. 8.
Figure 11:
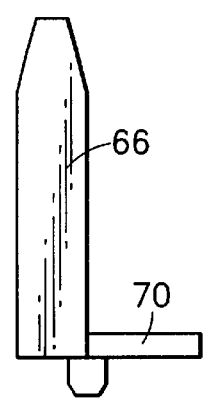
FIG. 11 is a right side elevational view of the prong of FIG. 8.
Figure 16:
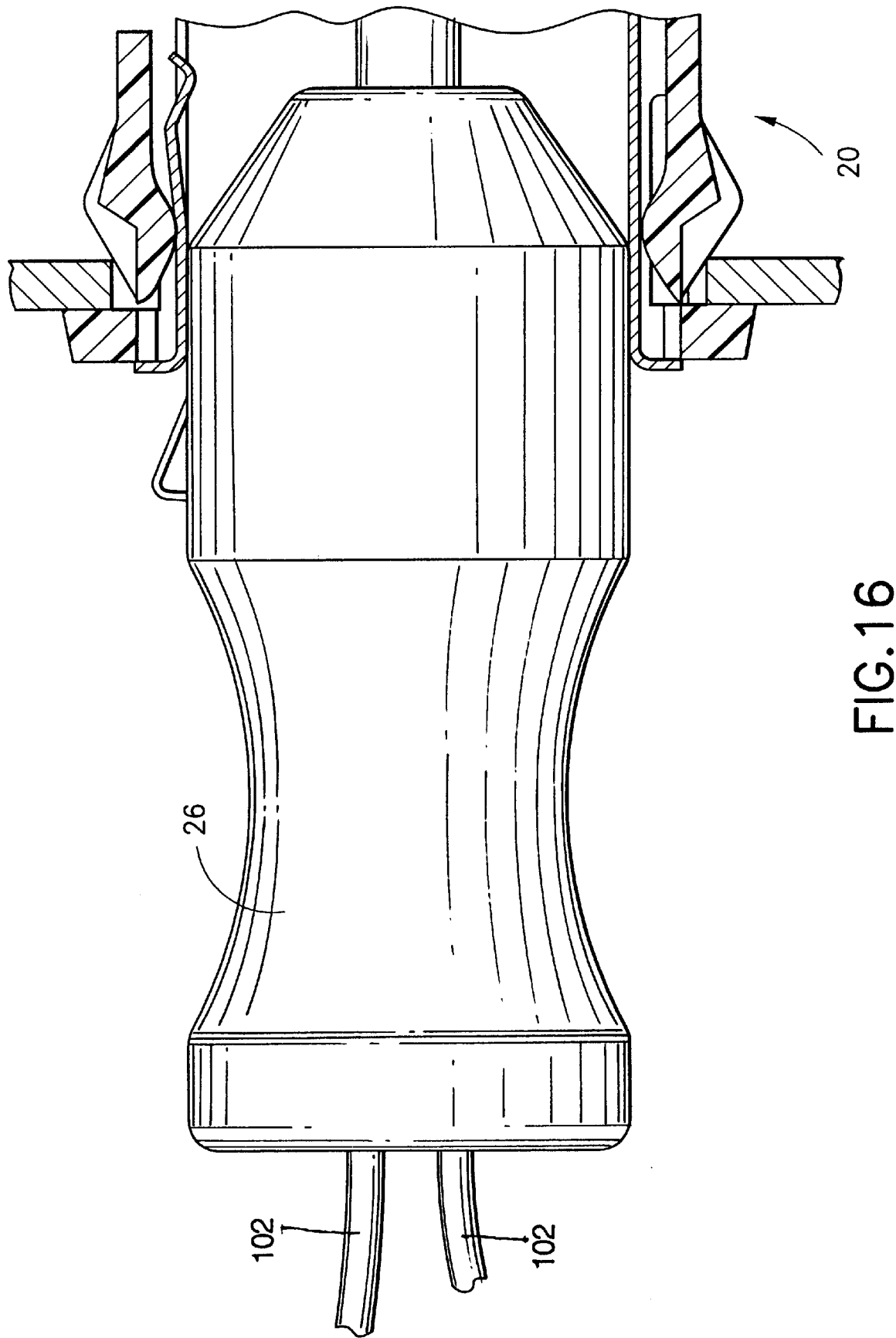
FIG. 16 is a complementary fragmentary axial sectional view of the cigar lighter of FIG. 15, showing the remainder of the structure. The cigar lighter of FIGS. 15 and 16 is shown as being used in the manner of a power outlet, to supply an appliance which requires electrical power of the type normally needed for the operation of a cigar lighter.

Considering first FIG. 1, the cigar lighter of the present invention consists basically of a holder device or socket 20 which is adapted to be supported on a panel 22, and is adapted to receive in its socket an electric ignitor plug 24 (FIG. 1) or else a power outlet plug 26, (FIG. 16). The holder or socket 20 is equipped with an illuminable device in the form of a plastic ring 28, commonly referred to in the trade as a "glow ring". The glow ring 28 is connected with a housing structure 30 that encloses a light-emitting means 32, here shown as a small incandescent electric lamp or bulb. The lamp 32 is energized through a pair of spring fingers 34 and 36 and suitable electrical connector strips (not shown) all carried by the housing structure 30 in a known manner. The ignitor plug 24 has a manually-operable knob 38 and a body portion 40, which latter carries an electric heating coil 42 in a cup 44. In FIG. 1 the cup 44 of the ignitor plug 24 is shown as contacting a cooperable depressible switch part or plunger 46 the central portion of which comprises a contact part 47 that functions as one contact of an automatic switching means 48. The other part of the switching means 48 comprises a contact part 50, said switching means being carried by the socket 20. The plunger 46 is slidable on an insulating block 52 which is rigidly mounted on the rear wall 74 of the socket 20 and which carries a threaded bushing 53 that receives a central screw 54 which constitutes part of the plus or positive circuit of the lighter.

The head 55 of the bushing 53 engages a spring 51 which biases the switch contact part 50 to the left as viewed in FIG. 1, as well as providing current thereto from the bushing. The contact 50 is mounted on an insulating sleeve that is slidably carried by the contact part 47. Between the end wall of the plunger 46 and the insulating bushing that mounts the contact 50 is a dished bimetallic snap disc 56 that can snap from a cold non-energizing position shown in FIG. 1 to an opposite energizing position snapped to the right in response to depressing movement of the ignitor plug 24 to the right. A fulcrum portion 58 of the insulating block 52 is engaged by the disk 56 to assist in such movement. This enables the switch contacts 47 and 50 to close, completing the circuit through the heating coil 42. Release of force from the knob 38 enables the igniting unit 24 to return to the position of FIG. 1, with the plunger 46 following so as to maintain contact between the cup 44 and plunger 46. The heating coil now heats up, and eventually causes the bimetallic disk 56 to snap back to the cold position of FIG. 1. This enables the switch contacts 47 and 50 to separate and thereby open the energizing circuit to the coil.

Energization is provided to the socket 20 in the following manner. At the rear wall 74 of the socket 20 an insulating terminal block 64 is provided, secured to said wall by the centralized plus or positive circuit screw 54 that is threaded into the bushing 53. Molded in the terminal block 64 are prongs 66 and 68 for connection respectively to the (plus) positive and the ground circuitry of the supply voltage. The positive prong 66 has a base portion 70 which is held under a metal grommet through which the screw 54 passes and which it contacts, and the ground prong 68 has a base portion 72 which contacts and is clamped against the rear wall 74 of the socket.

The operation of the lighter as thus far described can be briefly summarized as follows: The ignitor plug 24 is first depressed. In response to this, the cup 44 forces the plunger 46 to the right, which causes the bimetallic disk 56 to be fulcrummed and at its center snapped to the left, enabling the switch contact 50 to shift to the left, thereby engaging the cooperable switch contact 47, and closing the circuit through the screw 54, the contacts 50 and 47, the cup 44, the heating coil 42, the center stud 60 of the coil, and lastly the ignitor body 40 to the ground provided by the socket 20. Meanwhile removal of depressing force from the knob 38 enables the body 40 and switching means 48 to return to the initial position of FIG. 1, but with the heating element cup 42 remaining in contact with the plunger 46 under the action of a coil spring 62. Heating of the coil 42 causes the bimetallic disk 56 to eventually snap to the left to the cold position of FIG. 1, opening the energizing circuit by virtue of the separation of the switch contacts 47 and 50.

The above automatic action is the same as described in further detail in U.S. Pat. No. 4,207,455 identified above.

According to the present invention, illumination is provided for the glow ring 28 during those intervals when the heating coil 42 is being energized so as to give an indication of the same, and lack of illumination of the glow ring will indicate that the cigar lighter is in the unenergized state. This is accomplished by a simplified and improved circuitry, and with the addition of but few extra parts whereby the costs involved are minimized.

Referring to FIG. 1 the terminal block 64 is provided with a cylindrical projection 76 that extends forwardly and into an aperture in the back wall 74 of the socket 20, thereby to key these two components against turning. Also, a helical compression spring 78 is provided on said projection, extending through the back wall 74 of the socket 20 and bearing against the rear flange of the plunger 46 so as to make electrical contact with the same. The terminal block 64 has molded into it the base portion 80 of a contact shoe 82 which extends alongside the exterior of the block and is engaged by the light-current spring finger 36 carried by the lamp housing 30. Such housing also carries the light or low current (as distinguished from heavy current) spring finger 34 which is grounded by contact with the socket 20. By this arrangement a light-current energizing circuit is established to the lamp 32 whenever the plunger 46 becomes positive due to closing of the switch means 48 during depressing movement of the igniting plug 24.

Figure 12:
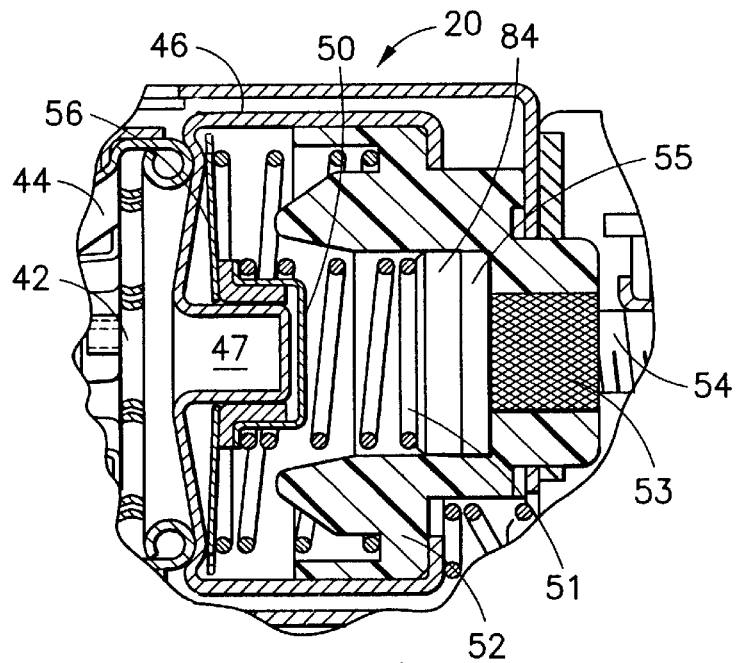
FIG. 12 is a fragmentary axial sectional view of portions of the cigar lighter shown in FIG. 1, but illustrating a modification of the invention wherein an automatic circuit control wafer is inserted in the power line of the socket, to safely control the electrical power being consumed by the lighter.

Another embodiment of the invention having a unique safety means is illustrated in FIG. 12, wherein components previously described have been given similar numerals. In this embodiment a positive temperature coefficient (PTC) wafer 84 is interposed between the head 55 of the bushing 53 and the coil spring 51 which engages the electrical switch contact 50. Such wafer constitutes a safety device, and will function to limit the operating current of the lighter, and prevent excessive current from being developed for whatever reason in the device. In other respects the operation of the lighter is as described above.

Figure 15:
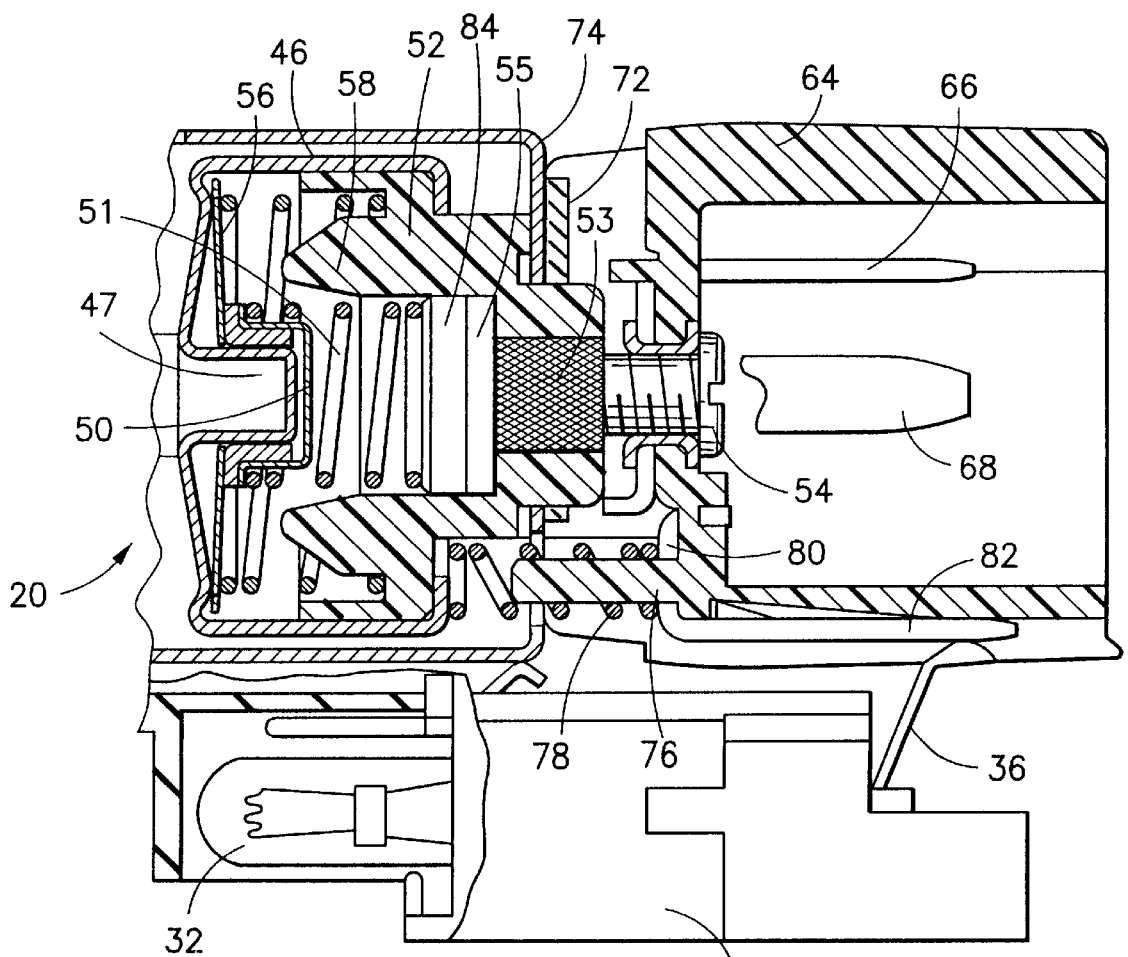
FIG. 15 is a fragmentary axial sectional view of portions of the cigar lighter of FIG. 1, but illustrating yet another embodiment of the invention.

Still another embodiment of the invention is illustrated in FIGS. 15 and 16, wherein the cigar lighter holding device or socket is adapted for use to provide a power outlet for the operation of auxiliary equipment at the proper voltage level. FIG. 16 shows the usual type of power outlet plug 26 which can be inserted in the socket 20 of the lighter described herein. As an additional safeguard, a current-limiting PTC wafer 84 can be inserted between the head 55 of the bushing 53 and the spring 51 which biases the switch contact 50 and supplies current thereto.

Figure 13:
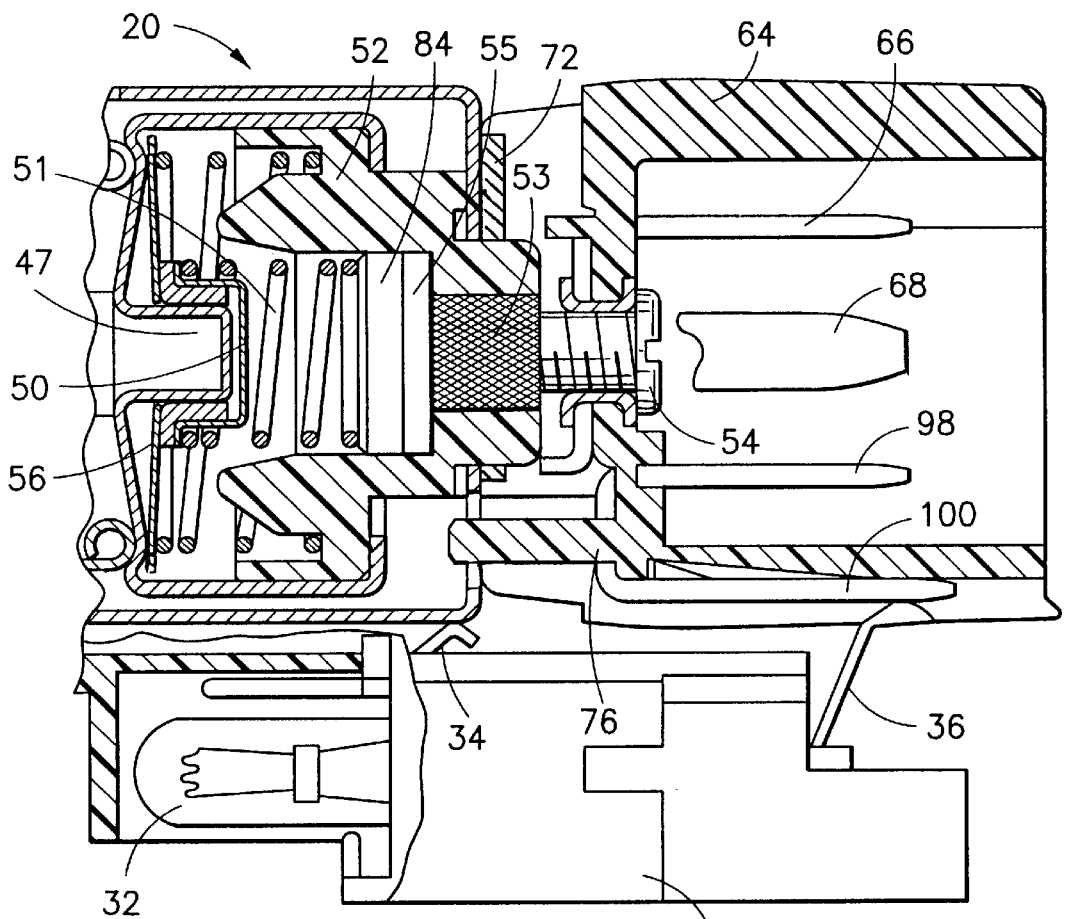
FIG. 13 is a fragmentary axial sectional view of portions of the cigar lighter of FIG. 1, illustrating another embodiment of the invention.
Figure 14:
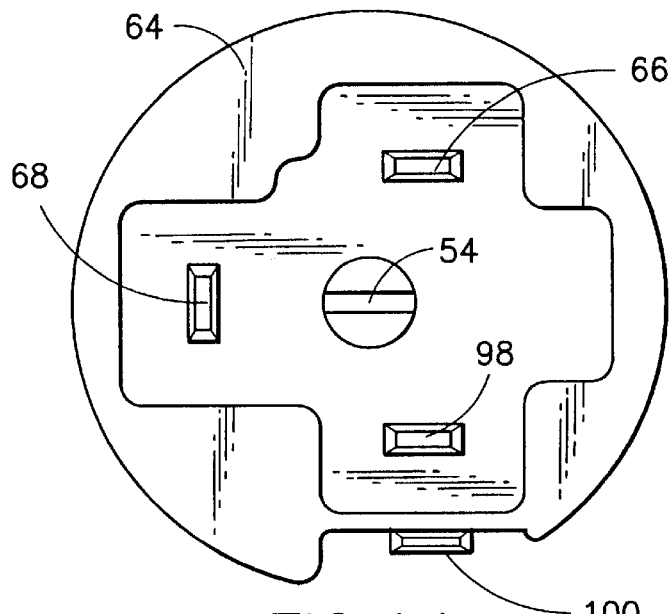
FIG. 14 is an end elevational view of portions of the connector plug assemblage of the cigar lighter of FIG. 13.

Yet another embodiment of the invention is illustrated in FIG. 13, wherein the illumination means for a glow ring (not shown) can be controlled from an exterior source. In this embodiment the terminal block 64 is provided with an auxiliary contact prong 98 which has a contact shoe 100 that is engaged with the contact leaf spring 36. In this embodiment no connection exists, as by the use of the spring 78 previously described, for establishing contact with the plunger 46. Thus a controlled voltage from any exterior source can be connected easily to the prong 98 and utilized to effect the illumination of the glow ring for the lighter.

It will now be seen from the foregoing that we have provided an improved and simplified cigar lighter and power outlet accessory which functions as an added convenience accessory for automobiles and other vehicles. The various components are readily economically fabricated and assembled, making for a low-cost recreation vehicle or other product.

Each and every one of the appended claims defines an aspect of the invention which is complete in and of itself, separate and distinct from all the others, and accordingly it is intended that each claim be treated in this manner when examined in the light of the prior art devices in any determination of novelty or validity.

Variations and modifications are possible without departing from the spirit of the invention, and portions of the improvement can be used without others.

What is claimed is:

1. An automatic electric cigar lighter comprising, in combination:
 a) a holder device including a socket having two electrical contacts forming part of the cigar lighter electrical circuit,
 b) an ignitor plug receivable in the socket, comprising a manually-operable part shiftable in the socket between closed energizing and open de-energizing positions,
 c) said plug having an electrical resistance heating element carried at its inner end,
 d) normally-open semi-automatic switch means including a plunger, for establishing an electrical circuit from the electrical contacts of the holder device through the heating element in response to shifting force applied to said manually-operable part to shift the same to its closed energizing position,
 e) means for automatically returning said manually operable part to its open de-energizing position upon removal of the shifting force therefrom,
 f) an illuminable member carried by said socket, including light-transmitting means,
 g) electric light-emitting means for providing illumination for said illuminable member,
 h) low current circuit means responsive to closing of said switch means, for energizing said light-emitting means, and
 i) means responsive to the attainment of a predetermined heating of said heating element, for opening said switch means, thereby to de-energize said light-emitting means,
 j) said circuit means comprising a helical compression spring continuously engaged with said plunger, to effect electrical contact therewith.

2. An automatic electric cigar lighter as set forth in claim 1, wherein the circuit means for energizing the light-emitting means comprises a light-current circuit line having a pair of light-current contacts which engage each other in abutting relation.

3. An automatic electric cigar lighter as set forth in claim 2, wherein said circuit line is carried by said socket.

4. An automatic electric cigar lighter as set forth in claim 3, wherein one of said light-current contacts comprises spring metal.

5. An automatic electric cigar lighter as set forth in claim 3, wherein the illuminable member comprises a glow ring which encircles said socket.

6. An automatic electric cigar lighter comprising, in combination:
   a) a holder device including a socket having two electrical contacts forming part of the cigar lighter electrical circuit,
   b) an ignitor plug receivable in the socket, comprising a manually-operable part movable in the socket between closed energizing and open de-energizing positions,
   c) said plug having an electrical resistance heating element carried at its inner end,
   d) normally-open semi-automatic switch means comprising a plunger having contacts and a heat-responsive holding latching device separate from said contacts, for closing and holding closed an electrical circuit from the electrical contacts of the holder device through the heating element in response force applied to said manually-operable part to shift the same to its closed energizing position, said holding latching device maintaining the switch means closed in response to said shifting movement and being rendered inoperative in response to the heating element attaining a predetermined temperature, thereby to allow the switch means to open the circuit through the heating element,
   e) an illuminable member carried by said socket, including light-transmitting means,
   f) electric light-emitting means for providing illumination for said illuminable member, and
   g) low current circuit means responsive to closing of the semi-automatic switch means, for energizing said light-emitting means,
   h) any opening of the said semi-automatic switch means as a result of heating of said heating element resulting in a discontinuance of energization of said light-emitting means and extinguishment of the said light for the illuminable member,
   i) said circuit means comprising a helical compressions spring continuously engaged with said plunger to effect electrical contact therewith.

7. An automatic electric cigar lighter as set forth in claim 6, wherein said switch means comprises a pair of abutting, cooperable contacts.

8. An automatic electric cigar lighter as set forth in claim 7, wherein said heat-responsive holding latching device comprises a snap-type bimetallic member.

9. An automatic electric cigar lighter as set forth in claim 6, wherein said heat-responsive holding latching device comprises a snap-type bimetallic member.

10. An automatic electric cigar lighter as set forth in claim 8, wherein said heat-responsive snap-type bimetallic member comprises a bimetallic disk.

11. An automatic electric cigar lighter as set forth in claim 6, wherein said circuit means for energizing the light-emitting means comprises a light-current circuit line having a pair of light-current contacts which engage each other in abutting relation.

12. An automatic electric cigar lighter as set forth in claim 11, wherein said circuit line is carried by said socket.

13. An automatic electric cigar lighter as set forth in claim 12, wherein one of said light-current contacts comprises spring metal.

14. An automatic electric cigar lighter comprising, in combination:
   a) a holder device including a socket having two electrical contacts forming part of the cigar lighter electrical circuit,
   b) an ignitor plug receivable in the socket, comprising a manually-operable part movable in the socket between closed energizing and open de-energizing positions,
   c) means for automatically returning the manually operable part to its de-energizing position upon removal of the shifting force therefrom,
   d) said ignitor plug having an electrical resistance heating element carried at its inner end,
   e) normally-open semi-automatic switch means including a plunger having contacts and a heat-responsive holding latching device separate from said contacts, for closing and holding closed an electrical circuit from the electrical contacts of the holder device through the heating element in response to force applied to said manually-operable part to shift the same to its closed energizing position, said holding latching device maintaining the switch means closed in response to said shifting movement and being rendered inoperative in response to the heating element attaining a predetermined temperature, thereby to allow the switch means to open the circuit through the heating element,
   f) an illuminable member carried by said socket, including light-transmitting means,
   g) electric light-emitting means for providing illumination for said illuminable member, and
   h) low current circuit means responsive to closing of the semi-automatic switch means, for energizing said light-emitting means,
   i) the opening of the said semi-automatic switch means as a result of heating of said heating element resulting in a discontinuance of energization of said light-emitting means and extinguishment of the said light for the illuminable member,
   j) said circuit means comprising a helical compression spring continuously engaged with said plunger to effect electrical contact therewith.

15. An electric utility outlet comprising, in combination:
   a) a holder device including a socket having two electrical contacts forming part of an electrical utility circuit,
   b) an electric plug receivable in the socket, comprising a manually-operable part movable in the socket between closed energizing and open de-energizing positions,
   c) said plug having an electrical line cord adapted for connection to an electrically-operated device,
   d) normally-open semi-automatic switch means including a plunger, for establishing an electrical circuit from the electrical contacts of the utility circuit of the holder device to the electric plug in response to force applied to said manually-operable part to shift the same to its closed energizing position,
   e) an illuminable member carried by said socket, including light-transmitting means,
   f) electric light-emitting means for providing illumination for said illuminable member,
   g) low current circuit means responsive to closing of said switch means, for energizing said light-emitting means, and
   h) safety means responsive to the occurrence of a predetermined electric overload of said utility circuit for opening said switch means, thereby to de-energize said light-emitting means, i) said circuit means comprising a helical compression spring continuously engaged with said plunger to effect electrical contact therewith.

16. An automatic electric cigar lighter as set forth in claim 15, wherein said circuit means for energizing the light-emitting means comprises a light-current circuit line having a pair of light-current contacts which engage each other in abutting relation.

17. An automatic electric cigar lighter as set forth in claim 16, wherein said circuit line is carried by said socket.

18. An automatic electric cigar lighter as set forth in claim 16, wherein one of said light-current contacts comprises spring metal.

19. An automatic electric cigar lighter as set forth in claim 16, wherein said safety means comprises a PTC member in the form of a wafer, disposed in series in the utility circuit.

* * * * *